United States Patent Office 3,136,669
Patented June 9, 1964

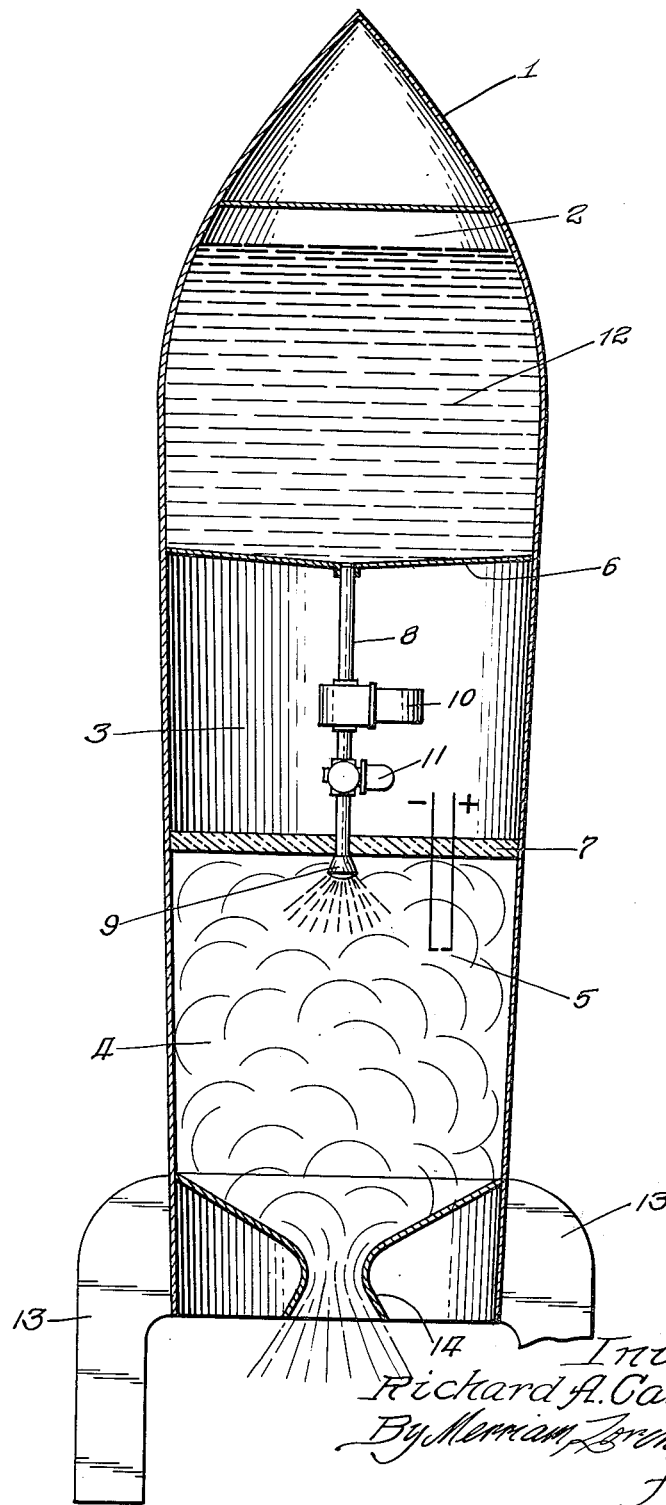

3,136,669
PARTICULATE POLYOLEFIN-LIQUID OXIDIZING AGENT PROPELLANT AND ROCKET CONTAINING THE SAME
Richard A. Carpenter, Prairie Village, Kans., assignor to Spencer Chemical Company, Kansas City, Mo., a corporation of Missouri
Filed Oct. 17, 1958, Ser. No. 767,946
6 Claims. (Cl. 149—74)

This invention relates to propellants and more particularly this invention is concerned with a monopropellant which may be utilized in fluid form, and rockets utilizing the monopropellant.

Recent developments in space technology have resulted in an increased demand for new and improved rockets and propellants therefor. Rockets are usually of two types, i.e., rockets with solid propellants and rockets with liquid propellants.

In solid propellant rockets, the propellant charge contains all of the chemical elements for complete burning. The charge, which is usually a mixture of solid fuel and solid oxidizer, is stored in the combustion chamber and upon ignition burns at a nearly constant rate forming the hot compressed gases which are accelerated and ejected at a high velocity through a nozzle, imparting momentum to the system. However, there are several disadvantages with solid propellant rockets such as difficulty of thrust vectoring, lack of combustion control such as throttling or cutoff, and sometimes nonuniform distribution of the oxidizer throughout the fuel resulting in erratic burning.

In liquid propellant rockets, the propellant is usually a bipropellant system consisting of a liquid oxidizer and a liquid fuel which are fed under pressure from separate tanks outside of the motor into the thrust chamber. The thrust chamber consists of a suitable combustion chamber with one or more pairs of nozzles adapted to inject therein the fuel and oxidizer separately and simultaneously. The bipropellant reacts to form the hot gases which are accelerated and ejected at a high velocity through the nozzle, providing momentum. This provides a system which can be started, throttled and shut off at will, giving much better control of thrust than is possible with solid propellants. However, the liquid bipropellant rocket propulsion system is highly complicated in design, requiring precision valves, pumps and complex feed mechanisms to supply the combustion chamber with fuel and oxidizer at the optimum rate.

According to the present invention there is provided a novel rocket containing a novel, stable self-sufficient fluid monopropellant of pre-determined composition, a combustion chamber with an exhaust gas discharge nozzle and means for conveying the fluid monopropellant to the combustion chamber for burning therein to obtain thrust.

The novel fluid monopropellant, which is one aspect of this invention, suitable for use in such a rocket comprises a stable fluid mixture of a finely divided polyolefin resin intimately and uniformly dispersed and essentially suspended in a liquid oxidizer which has no appreciable adverse effect on the polyolefin at the temperatures encountered in mixing and storing the monopropellant.

The term "fluid" used herein in regard to the monopropellant means true liquids as well as the more viscous liquids which are commonly referred to as gels and pastes and which have plastic or moldable physical characteristics. The term "fluid" thus includes substances "having particles which easily move and change their relative position without a separation of the mass, and which easily yield to pressure; capable of flowing," as defined by Webster's New Collegiate Dictionary, based on Webster's New International Dictionary, 2nd Edition. However, the term "fluid" is broadly intended to mean that the monopropellant can be fed from a monopropellant reservoir in the rocket into the combustion chamber of a rocket by suitable means such as by gravity, pumps or through acceleration of the rocket itself once it is in flight.

The invention will now be described in conjunction with the attached drawing in which there is shown a rocket propelled by the novel monopropellant herewith provided. This rocket is seen to contain a rocket body 1 containing an enclosed tank 2, a combustion chamber 4, rocket thrust nozzle 14 communicating with the combustion chamber and pipe or conduit 8 for conveying fluid monopropellant 12 by means of pump 10 and use of control valve 11 to the chamber 4 from tank 2. Space 3 is provided between the base plate 6 of the fuel tank 4 and the insulated top 7 of the combustion chamber to provide protection against excessive heat transfer to the fuel tank. Nozzle 9 is provided to spray the monopropellant into the combustion chamber to facilitate burning. The rocket is provided with stabilizing fins 13 which function as legs for the rocket to stand on for vertical firing. Electrical arc device 5 is provided to fire the rocket although a pyrotechnic device may also be used for firing.

Although the rocket shown in the drawing is provided with pump means for feeding the monopropellant to the combustion chamber, a source of compressed gas may be alternatively employed to effect the feeding. In addition, once the rocket has been fired and is accelerating, the force of acceleration and the inertia of the monopropellant should cause the fluid monopropellant to be fed into the combustion chamber.

Although not shown in the drawing, the stability of the monopropellant makes it possible to circulate it around the combustion chamber as a cooling liquid prior to its being fed into the chamber for burning.

Rockets employing the resinous polyolefin-liquid oxidizer monopropellants of this invention ignite at temperatures of about 1200–1400° F. although the temperature will vary with the oxidizer employed. Once ignition is effected, however, the burning is self-sustaining.

The novel rocket of this invention utilizing such a fluid monopropellant has all or nearly all of the advantages of rockets utilizing liquid bipropellants but is free of many of the disadvantages. Thus, the monopropellant rocket requires less than one-half of the plumbing needed in liquid bipropellant systems so that great weight reduction is possible, reduced cost is achieved through the elimination of expensive control devices, and the likelihood of breakdown or malfunction in storage or flight is accordingly reduced greatly. Because the monopropellant is stable and self-sufficient, the rocket need contain only a single fuel storage tank and a single set of feeding devices and controls for injecting the monopropellant into the combustion chamber. In addition, since the ingredient composition of the monopropellant is predetermined, controls for varying the feed of a separate oxidizer and a separate fuel as in liquid bipropellant systems are not needed.

Oxidizers which are suitable for producing the monopropellants of this invention include liquid oxidizers such as red fuming nitric acid, white fuming nitric acid, dinitrogen tetraoxide and hydrogen peroxide. The oxidizers should be liquid at the temperature of mixing and storage, which in some cases may be below room temperature. In evaluating possible liquid oxidizers, individual properties such as density, freezing point, and cost are considered as well as the collective properties of the polyolefin-oxidizer mixtures. In the preferred embodiment of this invention, the oxidizer is red fuming nitric acid (RFNA), which may be described as concentrated nitric acid containing excess $No_2$ (8–22% $NO_2$).

The resinous polyolefins which are suitable fuels in the monopropellants are those derived by the polymerization of olefins, for example, polyethylene, polypropylene, polybutene-1 and polyisobutylene. Various grades of resinous polyolefins are suitable; for example, with polyethylene, I have found that the lower density material as well as medium density and high density resins may be employed successfully.

Finely divided polyolefins for use in the monopropellants may be prepared by several procedures such as precipitation, grinding or milling. In preparing milled material, the resin is milled or "banburied" at the fusion temperature and then rapidly cooled while continuing the banburying process until the finely divided material results. In the precipitation process, the resin is dissolved in a hot organic solvent, such as xylene, and allowed to gel, and then a nonsolvent for the resin such as methanol or water is added to precipitate the finely divided polyolefin.

The particle size of the polyolefin in the monopropellant may be from about 1 to about 500 microns. However, it has been found that when polyolefins having a particle size of about 50 to 150 microns are used, the resultant propellant mixture is characterized by enhanced mixture and excellent storage stability. That is, the mixture remains homogeneous and does not separate into two components upon standing for several days.

The ratio of oxidizer to polyolefin, and the type of oxidizer used, determine the extent of oxidation of the polyolefin. The optimum oxidizer to polyolefin weight ratio for maximum specific impulse will generally lie within two levels, viz., that which gives partial oxidation (fuel rich):

$$(CH_2) + O_2 \rightarrow CO + H_2O$$

and that which gives complete oxidation (stoichiometric):

$$(CH_2) + 1.5\ O_2 \rightarrow CO_2 + H_2O$$

The following table shows the required weight ratio of oxidizer to finely divided resinous polyolefin for propellants containing various oxidizers.

Table I

| Oxidizer | Extent of oxidation | Wt. ratio (oxidizer to polyolefin) |
|---|---|---|
| RFNA [1] | Partial | 3.5:1 |
|  | Complete | 5.3:1 |
| WFNA [2] | Partial | 3.6:1 |
|  | Complete | 5.4:1 |
| 100% $H_2O_2$ | Partial | 4.9:1 |
|  | Complete | 7.3:1 |
| 90% $H_2O_2$ | Partial | 5.4:1 |
|  | Complete | 8.1:1 |
| $N_2O_4$ | Partial | 3.3:1 |
|  | Complete | 4.9:1 |

[1] RFNA = red fuming nitric acid (20% $NO_2$). 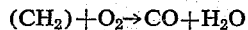
[2] WFNA = white fuming nitric acid. 

Of course, it is obvious these ratios may be higher or lower; however, this will usually result in unreacted fuel or oxidizer, with a resulting lowered combustion efficiency. Broadly speaking, however, from 3 to 8 parts by weight of oxidizer may be combined with 1 part of polyolefin.

The following examples show the good mixture stability of polyethylene-oxidizer mixtures of this invention. The general procedure of making these mixtures was as follows:

A sample of 3 grams of the finely-divided polyethylene was placed in a graduated 50 ml. centrifuge tube. Red fuming nitric acid (15.9 grams) having approximately 20% $NO_2$ was added to the centrifuge tube and the mixture stirred with a stirring rod until a slurry was obtained. This gave a weight ratio of oxidizer to polyethylene of 5.3:1. An oil-sealed stirrer was then fitted in place and the mixture stirred at about 500 r.p.m. for five hours at room temperature. The stirrer was then replaced with a stopper and the mixture allowed to stand for 16 hours at room temperature. The amount of red fuming nitric acid which separated out after standing was recorded. The mixture was then centrifuged at 500 r.p.m. for five minutes and the amount of oxidizer which separated out was again recorded.

In several runs, the stirring and centrifuging procedures were repeated one or two times to give total stirring periods of 10 and 15 hours and total standing times of 32 and 48 hours. The amount of oxidizer which had separated out was recorded after each 16 hour period.

The following table gives the results.

Table II

| Run | Type of polyethylene [1] (PE) | Method of prep. of PE [2] | Particle size of PE (microns) | Apparent bulk density of PE (g./ml.) | Total stirring time (hrs.) | Total standing time (hrs.) | Oxidizer separated out After standing ml. | Oxidizer separated out After standing Percent | Oxidizer separated out After centrifuging ml. | Oxidizer separated out After centrifuging Percent |
|---|---|---|---|---|---|---|---|---|---|---|
| 1A | HD | P | 50–100 | 0.24 | 5 | 16 | 0.1 | 1 | 2.0 | 20 |
| 1B | HD | P | 50–100 | 0.24 | 10 | 32 | 0.0 | 0 | 2.0 | 20 |
| 1C | HD | P | 50–100 | 0.24 | 15 | 64 | 0.0 | 0 | 2.0 | 20 |
| 2A | HD | P | <50 | 0.26 | 5 | 16 | 0.1 | 1 | 2.0 | 20 |
| 2B | HD | P | <50 | 0.26 | 10 | 32 | 0 | 0 | 1.5 | 15 |
| 2C | HD | P | <50 | 0.26 | 15 | 64 | 0 | 0 | 1.3 | 13 |
| 3 | MD | P | <50 | 0.28 | 5 | 16 | 0.2 | 2 | 2.2 | 22 |
| 4 | MD | M | 200–250 | 0.41 | 5 | 16 | 0.5 | 5 | 4.5 | 45 |
| 5 | MD | M | 150–200 | 0.39 | 5 | 16 | 0.3 | 2 | 4.0 | 40 |
| 6 | LD | M | 250–300 | 0.35 | 5 | 16 | 4.0 | 40 | 4.8 | 48 |
| 7 | LD | M | <50 | 0.39 | 5 | 16 | 1.5 | 15 | 4.5 | 45 |
| 8 | LD | P | <50 | 0.32 | 5 | 16 | 0.5 | 5 | 4.0 | 40 |

[1] HD = high density (0.960). MD = medium density (0.935). LD = lower density (0.918).
[2] P = precipitated. M = milled.

The oxidizer (RFNA), although a liquid, is of higher density than the polyolefin, a solid, so that the small quantity of oxidizer which separates is at the bottom of the mixture. This is a feature which is advantageous in rocket storage since plugging of outlet ports by a heavy solid at the bottom of a tank is avoided.

In a similar experiment with a $N_2O_4$-polyethylene mixture comprising a 4.9:1 weight ratio of oxidizer to polyethylene, after standing 16 hours at 10° C., none of the oxidizer had separated out and after centrifuging, 0.8 ml. (8%) of the oxidizer had separated out.

The following examples demonstrate the good storage stability of representative oxidizer-polyethylene mixtures of this invention.

A 12 g. sample of finely divided polyethylene which had been prepared by milling with a commercial Banbury mill and then screened to a particle size of 50–100 microns (apparent bulk density of 0.38 g./ml.) was prepared from a commercial, medium density (.935) polyethylene. The polyethylene was placed in a 125 ml. Erlenmeyer flask and 63.3 g. of red fuming nitric acid was added to the flask to give an oxidizer-to-polyethylene weight ratio of 5.3:1. The flask was stoppered and the contents mixed by swirling until a slurry was obtained. The stoppered flask was allowed to stand with daily swirling at approximately room temperature. Samples were removed after 9 and 17 days of standing. Each sample was diluted with a large volume of water and filtered. The filter cake was washed with water until the filtrate was neutral and the washed polyethylene was triturated with ether, filtered and vacuum dried. The dried polyethylene was analyzed for nitrogen content to determine the extent of chemical reaction with the oxidizer. After standing 9 days, the polyethylene had a nitrogen content of 0.30% and after standing 17 days there was found a nitrogen content of 0.32%. This indicates that there is very little chemical reaction between the oxidizer and the polyethylene at room temperature, thus, indicating the mixture has very good storage stability characteristics.

Similar storage stability tests with RFNA-polyethylene and $N_2O_4$-polyethylene mixtures at 158° F. indicated good storage stability even at this elevated temperature.

The propellants of this invention also have very good stability to ignition or decomposition due to impact or compression as determined by preliminary drop weight tests. This indicates that the propellants and rockets containing the same may be safely handled by operating personnel without many of the safety precautions which are necessarily associated with many other propellants.

It has also been found that mixing the polyolefin and liquid oxidizer evolves no heat, thus providing a safer propellant system.

For an experiment to study the injection, ignition and burning of RFNA-polyethylene mixtures, a simple hot tube reactor assembly was assembled which was composed of the following parts:

(A) A fuel reservoir, fuel line and injector were constructed of a 1.5 cm. I.D. x 20 cm. length of Pyrex tubing connected to a piece of 2 mm. I.D. Pyrex capillary tubing. The fuel was forced into the combustion chamber by means of nitrogen pressure.

(B) A combustion chamber was constructed of a 1.8 cm. I.D. x 36 cm. length of Vicor tubing. The tube was heated by means of a rheostat controlled combustion furnace (20 cm. long).

The fuel reservoir was filled with the propellant mixture and the nitrogen pressure line connected. The furnace was then heated to the desired temperature and swept with nitrogen. The propellant mixtures were injected by nitrogen pressure at the desired velocity and angle. Ignition and burning characteristics were noted and recorded. The following table gives the results.

*Table III*

| Run No. | Type of polyethylene in mixture [1] | Reactor tube temp. (° F.) | Ignition | Type of burning |
|---|---|---|---|---|
| 1 | High density | 1,000 | No | Some sparking. |
| 2 | do | 1,200 | Yes | Intermittent. |
| 3 | do | 1,200 | Yes | Steady fire. |
| 4 | Low density | 1,470 | Yes | Few short flashes. |
| 5 | do | 1,470 | Yes | Do. |
| 6 | Medium density | 1,470 | Yes | Sparks and short flashes. |
| 7 | do | 1,370 | Yes | Steady fire. |
| 8 | do | 1,350 | Yes | Do. |
| 9 | do | 1,350 | Yes | Do. |

[1] RFNA (20%$NO_2$)-polyethylene (particle size 50–100 microns) mixtures with an oxidizer-to-fuel ratio of 5.3:1. The high density polyethylene had a density of .960, the medium density material had a density of .935, and the low density material had a density of .918.

The results of this test show that ignition can be readily obtained at atmospheric pressure by employing a combustion chamber temperature in the range of about 1200–1400° F.

Although the examples are all with polyethylene, it is to be understood that other finely divided resinous polyolefins are also suitable as fuels for the propellants of this invention. Since they contain the same elements, carbon and hydrogen, the oxidizer to fuel ratios would be the same, dependent upon the oxidizer. Examples of other suitable polyolefins would include polypropylene, polybutene-1, polyisobutylene, etc.

Obviously, various additives may also be employed in the propellants systems of this invention, for example, to increase the heat of combustion or to modify the burning rate.

Various other changes and modifications of the invention can be made and, to the extent that such variations incorporate the spirit of this invention, they are intended to be included within the scope of the appended claims.

What is claimed is:

1. A self-sufficient propellant consisting essentially of mixture of finely-divided polyethylene and fuming nitric acid, said mixture having a weight ratio of red fuming nitric acid to polyethylene of approximately 3.3 to 5.4 to 1, the finely-divided polyethylene having a particle size of approximately 50 to 150 microns and said mixture as a whole taking the physical form of a liquid in which said finely-divided polyethylene is dispersed and which is susceptible of being fed in liquid form to a thrust chamber.

2. A self-sufficient fluid monopropellant consisting essentially of a ratio of one part by weight of a finely-divided resinous polyolefin having a particle size of 1 to 500 microns dispersed in 3 to 8 parts by weight of a liquid oxidizing agent selected from the group consisting of red fuming nitric acid, white fuming nitric acid, dinitrogen tetraoxide and hydrogen peroxide.

3. A self-sufficient fluid monopropellant consisting essentially of a ratio of one part by weight of a finely-divided resinous polyethylene having a particle size of 1 to 500 microns dispersed in 3 to 8 parts by weight of red fuming nitric acid.

4. A self-sufficient fluid monopropellant consisting essentially of a ratio of one part by weight of a finely-divided resinous polyolefin having a particle size of 1 to 500 microns dispersed in 3 to 8 parts by weight of white fuming nitric acid.

5. A self-sufficient fluid monopropellant consisting essentially of a ratio of one part by weight of a finely-divided resinous polyolefin having a particle size of 1 to 500 microns dispersed in 3 to 8 parts by weight of dinitrogen tetraoxide.

6. A self-sufficient fluid monopropellant consisting essentially of a ratio of one part by weight of a finely-divided resinous polyolefin having a particle size of 1 to 500 microns dispersed in 3 to 8 parts by weight of hydrogen peroxide.

References Cited in the file of this patent

UNITED STATES PATENTS

| | | |
|---|---|---|
| 2,537,526 | Hannum | Jan. 9, 1951 |
| 2,814,929 | Morley et al. | Dec. 3, 1957 |

FOREIGN PATENTS

| | | |
|---|---|---|
| 582,621 | Great Britain | Nov. 22, 1946 |

OTHER REFERENCES

Moore et al.: Jet Propulsion, vol. 26, No. 11, November 1956, pp. 965–8.

Chemical and Engineering News, May 27, 1957, pp. 18–23.

Zaehringer: Solid Propellant Rockets, Second Stage, American Rocket Co., Box 1112, Wyandotte, Mich., September 1958, pp 229–30.